United States Patent [19]
Kaloustian

[11] Patent Number: 5,645,202
[45] Date of Patent: Jul. 8, 1997

[54] COLLAPSIBLE CARRIER

[76] Inventor: John Kaloustian, 830 W. Main St., Northville, Mich. 48167

[21] Appl. No.: 275,051

[22] Filed: Jul. 13, 1994

[51] Int. Cl.[6] .................... B60R 9/00; B60R 9/10
[52] U.S. Cl. .............. 224/314; 224/493; 224/497; 224/509; 224/532; 224/924
[58] Field of Search .................. 224/924, 314, 224/329, 493, 497, 509, 532

[56] References Cited

U.S. PATENT DOCUMENTS

| | | | |
|---|---|---|---|
| 3,464,608 | 9/1969 | Rodriguez | 224/42.03 |
| 3,877,622 | 4/1975 | McLain | 224/924 |
| 4,085,874 | 4/1978 | Graber. | |
| 4,109,839 | 8/1978 | Allen | 224/924 |
| 4,182,467 | 1/1980 | Graber | 224/309 |
| 4,394,948 | 7/1983 | Graber | 224/314 |
| 4,403,716 | 9/1983 | Carlson et al. | 224/924 |
| 4,513,897 | 4/1985 | Graber | 224/314 |
| 4,830,250 | 5/1989 | Newbold et al. | 224/314 |
| 4,997,116 | 3/1991 | Grim | 224/42.03 |
| 5,056,699 | 10/1991 | Newbold et al. | 224/314 |
| 5,056,700 | 10/1991 | Blackburn et al. | 224/324 |
| 5,118,020 | 6/1992 | Piretti | 224/324 |
| 5,135,145 | 8/1992 | Hannes et al. | 224/314 |
| 5,195,670 | 3/1993 | Piretti et al. | 224/321 |
| 5,211,323 | 5/1993 | Chimenti et al. | 224/314 |

FOREIGN PATENT DOCUMENTS

WO91/04866  4/1991  WIPO ............... B60R 9/06

OTHER PUBLICATIONS

Product Brochure, Yakima '90–'91, 2 pages.

*Primary Examiner*—Linda J. Sholl
*Attorney, Agent, or Firm*—Brinks Hofer Gilson & Lione

[57] ABSTRACT

A bicycle carrier for attachment to a vehicle includes a lower mounting member, an upper mounting member and a support member. The upper mounting member is pivotably attached to the lower mounting member to pivot about a horizontal pivot axis. The support member is pivotably attached to the lower mounting member to pivot about a vertical pivot axis. The lower mounting member, the upper mounting member and the support member can be pivoted about their respective axes to lie in a substantially coplanar storage position.

12 Claims, 7 Drawing Sheets

COLLAPSIBLE CARRIER

BACKGROUND OF THE INVENTION

1. Field of the Invention

This invention relates generally to carriers for attachment to a vehicle to carry various types of loads, and specifically relates to a collapsible bicycle carrier that can be adjusted for mounting on various types and sizes of vehicles or used to store a bicycle on a wall.

2. Background of the Invention

A number of carriers have been designed for attachment to the rear of a vehicle for transporting various loads, such as bicycles. For a variety of reasons, such carriers are typically attached to the vehicle only during actual use, and thereafter they are removed and stored. As a result, many carriers are collapsible, thereby facilitating ease of transport and storage.

Examples of collapsible carriers are disclosed in U.S. Pat. Nos. 4,394,948, 5,056,699, 5,195,670, and 5,135,145. The bicycle carriers described in these patents disclose two frame members designed to rest on the vehicle, and two support arms designed to support a bicycle. The support arms and frame members rotate about parallel axes, and can therefore be positioned within substantially the same plane.

Such designs, however, present a number of drawbacks. For example, positioning such devices can be difficult and cumbersome, since the user must adjust the four components (i.e., the two support arms and the two frame members) independently. In addition, the support arms in such designs rotate up and down, and are locked in position by a variety of locking mechanisms. The load-bearing capacity of the support arms is therefore limited by the load-bearing capacity of the locking mechanism. Furthermore, should the locking mechanism fail during use, the force from the load will cause the support arms to rotate downward, and the load may fall from the carrier.

U.S. Pat. No. 4,997,116 also discloses a collapsible rear mount bicycle rack. In particular, this patent discloses a rack having four bicycle supporting brackets pivotally mounted to a frame. Stationary L-shaped bumper stops are used to position the carrier on the vehicle, and tension bearing vehicle-mounting straps are used to secure the carrier to the vehicle.

SUMMARY OF THE INVENTION

According to a first aspect of this invention, a carrier is provided for attachment to a vehicle. This carrier comprises a lower mounting member, an upper mounting member and a support member. The upper mounting member is pivotably associated with the lower mounting member such that the upper mounting member may be pivoted with respect to the lower mounting member about a mounting member pivot axis. The support member is pivotably associated with the lower mounting members such that the support member may be pivoted with respect to the lower mounting member about a support member pivot axis. The support member pivot axis is substantially perpendicular to the mounting member pivot axis such that the lower mounting member, the upper mounting member and the support member can be positioned in a substantially coplanar storage position.

According to a second aspect of this invention, a collapsible bicycle carrier for attachment to the rear of a vehicle includes a joint, a lower mounting member, an upper mounting member, and a support member. The joint has a plurality of stops and a passageway with a substantially vertical

2 portion. The lower mounting member has an upper portion extending into the vertical portion of the passageway such that the joint is pivotable about a first axis that is parallel to the upper portion of the lower mounting member. The upper mounting member is pivotably attached to the lower mounting member and includes a configuration pin. A support member is associated with the joint such that the support member rotates with the joint about the first axis. When the support member is pivoted about the first axis to an operative position, the configuration pin engages a selected one of the stops.

BRIEF DESCRIPTION OF THE DRAWINGS

For a more complete understanding of this invention, reference should now be made to the embodiments illustrated in greater detail in the accompanying drawings, and described by way of example only. In the drawings:

FIG. 4a is a perspective view of the sleeve shown in FIG. 2.

FIG. 4b is a top view of the sleeve of FIG. 4a.

FIG. 5 is a perspective view of a carrier incorporating another embodiment of the present invention.

DETAILED DESCRIPTION OF THE PREFERRED EMBODIMENTS

Figure 1:
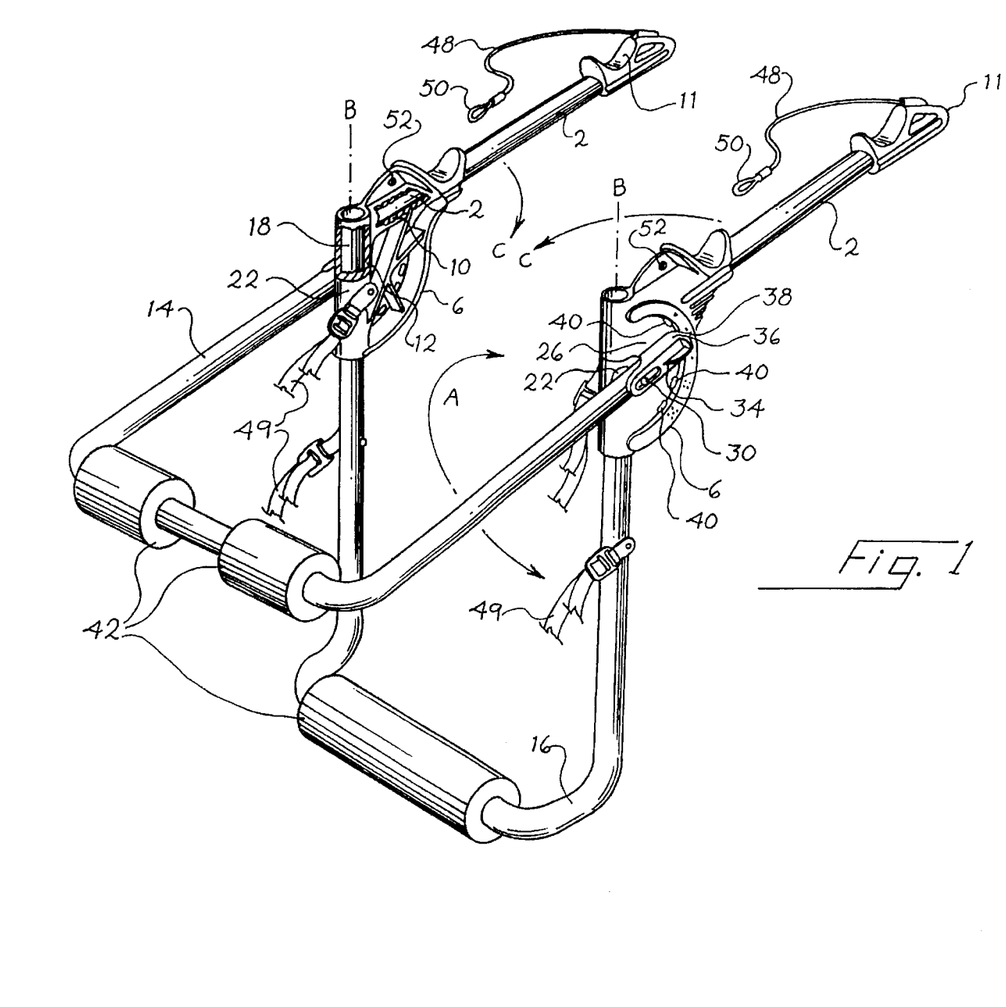
FIG. 1 is a perspective view of a carrier that embodies the present invention.

Referring now to FIG. 1, the illustrated carrier includes two support members (2), two joints (6), an upper mounting member (14), and a lower mounting member (16).

Figure 2:
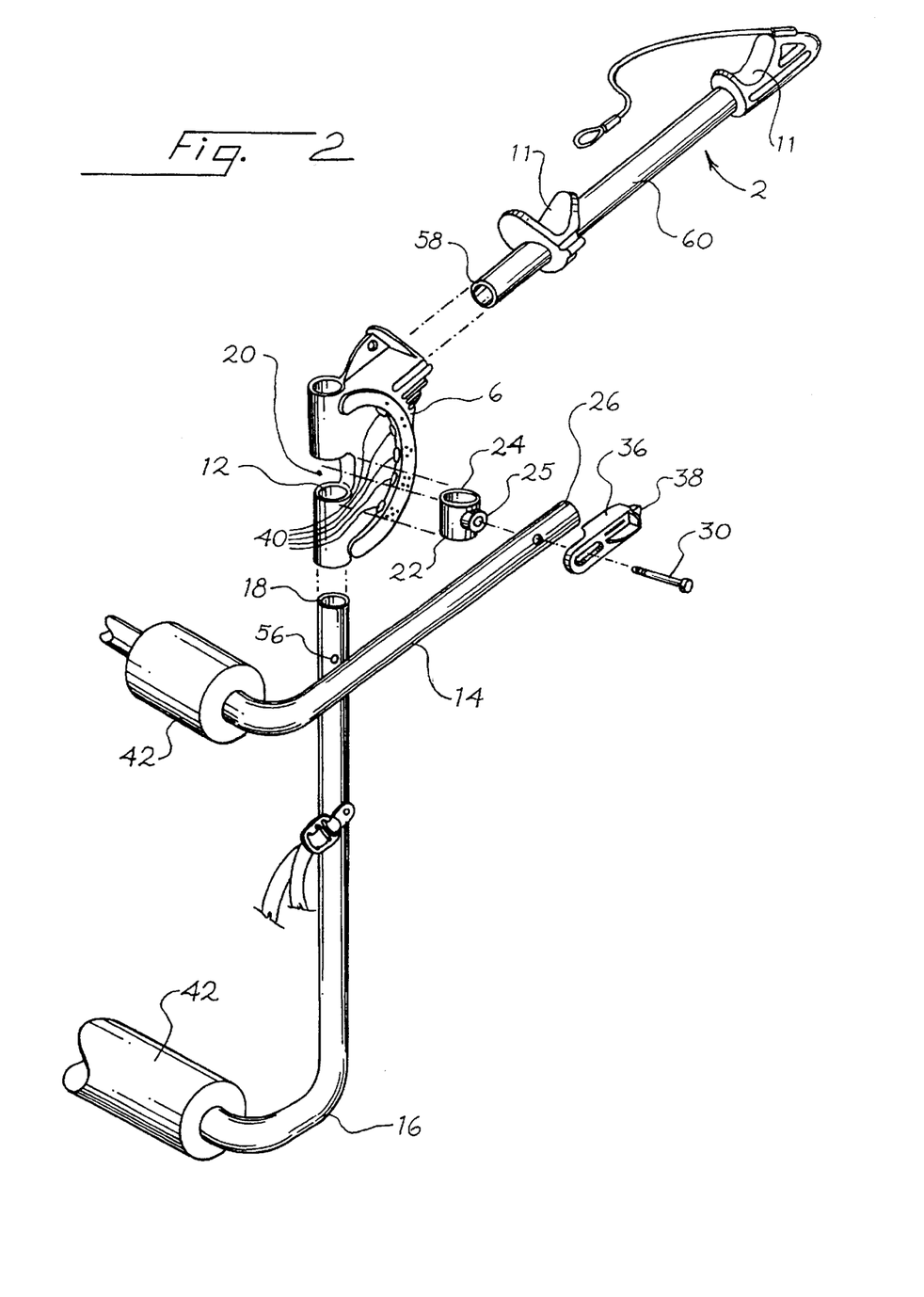
FIG. 2 is an exploded perspective view of half of the carrier shown in FIG. 1.

As shown in FIG. 2, each support member (2) preferably includes a hollow tube (58) having padding (60) covering a substantial portion thereof. The tube (58) may be made from any metal, and the padding (60) may be made from rubber of vinyl. Preferably, the padding (60) is applied by vinyl-dipping the tube (58) or by over-molding rubber onto the tube (58). The support member (2) may include one or more saddles (11) to prevent the load from sliding off the carrier when in use. The saddle (11) may be made from plastic or rubber.

The upper mounting member (14), and the lower mounting member (16) also include hollow metal tubes. The mounting members (14), (16) may be formed from a variety of materials, preferably a metal such as steel. In the embodiment shown in FIG. 1, the upper mounting member (14) and the lower mounting member (16) are essentially U-shaped.

The carrier of FIG. 1 includes joints (6) associated with the support members (2). Each joint (6) may be made from glass-filled nylon. Each joint (6) includes a substantially horizontal passageway (10) and a substantially vertical passageway (12).

As shown in the cut-away section of the joint (6) in FIG. 1, each support member (2) extends into and is secured within the substantially horizontal passageway (10). The support members (2) may be secured within the passageway (10) by any conventional means, including rivets, adhesives, or press fits. The support members (2) are securely attached to the joints (6) in order to impart sufficient structural strength to enable the support members (2) to support the weight of a load, such as a bicycle. For example, in a preferred embodiment of the present invention, the support members (2) extend into the passageway (10) by about 4 inches, and the support members are secured within the passageway (10) by riveting. Such a design can support loads of 300 pounds per support member or more, depending on the materials used.

Figures 4A, 4B, 5:
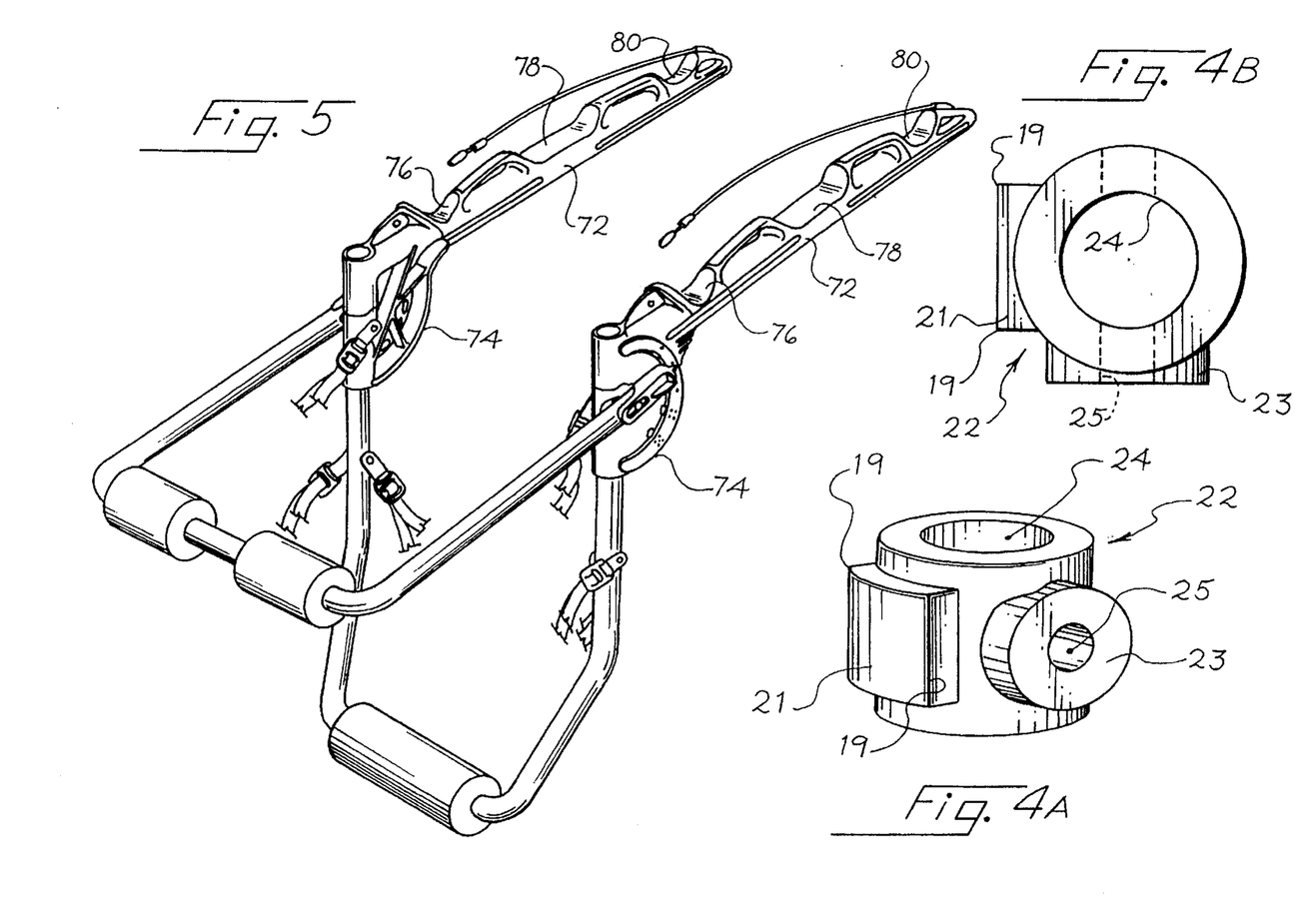

As shown in FIG. 2, each joint (6) includes a cavity (20) that extends along the vertical passageway (12). The cavity (20) is adapted to receive a sleeve (22). As shown in FIGS. 4a and 4b (in which the sleeve (22) is inverted for clarity of illustration), the sleeve (22) is preferably T-shaped, and includes a substantially vertical channel (24) and a substantially horizontal channel (25) surrounded by a boss (23). A second boss (21) extends at right angles to the first boss (23), and the second boss (21) defines edges (19) that interfere with the joint (6) to releaseably latch the joint (6) in both an operational position and a storage position.

Referring again to FIGS. 1 and 2, the sleeve (22) is positioned within the cavity (20), such that the substantially vertical channel (24) is aligned with and is substantially concentric with the substantially vertical passageway (12). The upper ends (18) of the lower mounting member (16) are then positioned within the substantially vertical passageways (12) of the joints (6) and the vertical channels (24) of the sleeves (22).

Once the upper ends (18) of the lower mounting member (16) are positioned within the vertical passageway (12), the upper mounting member (14) is pivotally secured to the upper ends (18) of the lower mounting member (16). Preferably, the upper mounting member (14) is secured by an axial pin or bolt (30) that extends through the horizontal channel (25) of the T-shaped sleeve (22), through the openings (56) on the upper ends (18) of lower mounting member (16), and out the opposite end (32) of the sleeve (22), as illustrated best in FIGS. 1, 2, and 4. The axial pin or bolt (30) secures the upper mounting member (14) to the lower mounting member (16), and acts as a pivot point that enables the upper mounting member (14) to rotate about a generally horizontal axis in the direction indicated by the arrow (A) in FIG. 1. As a result, the upper mounting member (14) may assume a range of angular positions relative to the lower mounting member (16). The axial pin or bolt (30) also serves to secure the upper ends (18) of the lower mounting member (16) within both the vertical passageway (12) and the vertical channel (24). Consequently, the upper ends (18) are secured such that the joints (6) may rotate about a substantially vertical axis (B) defined by the upper ends (18) of the lower mounting member (16), as indicated by the arrows (C) in FIG. 1.

Figures 3A, 3B, 6:
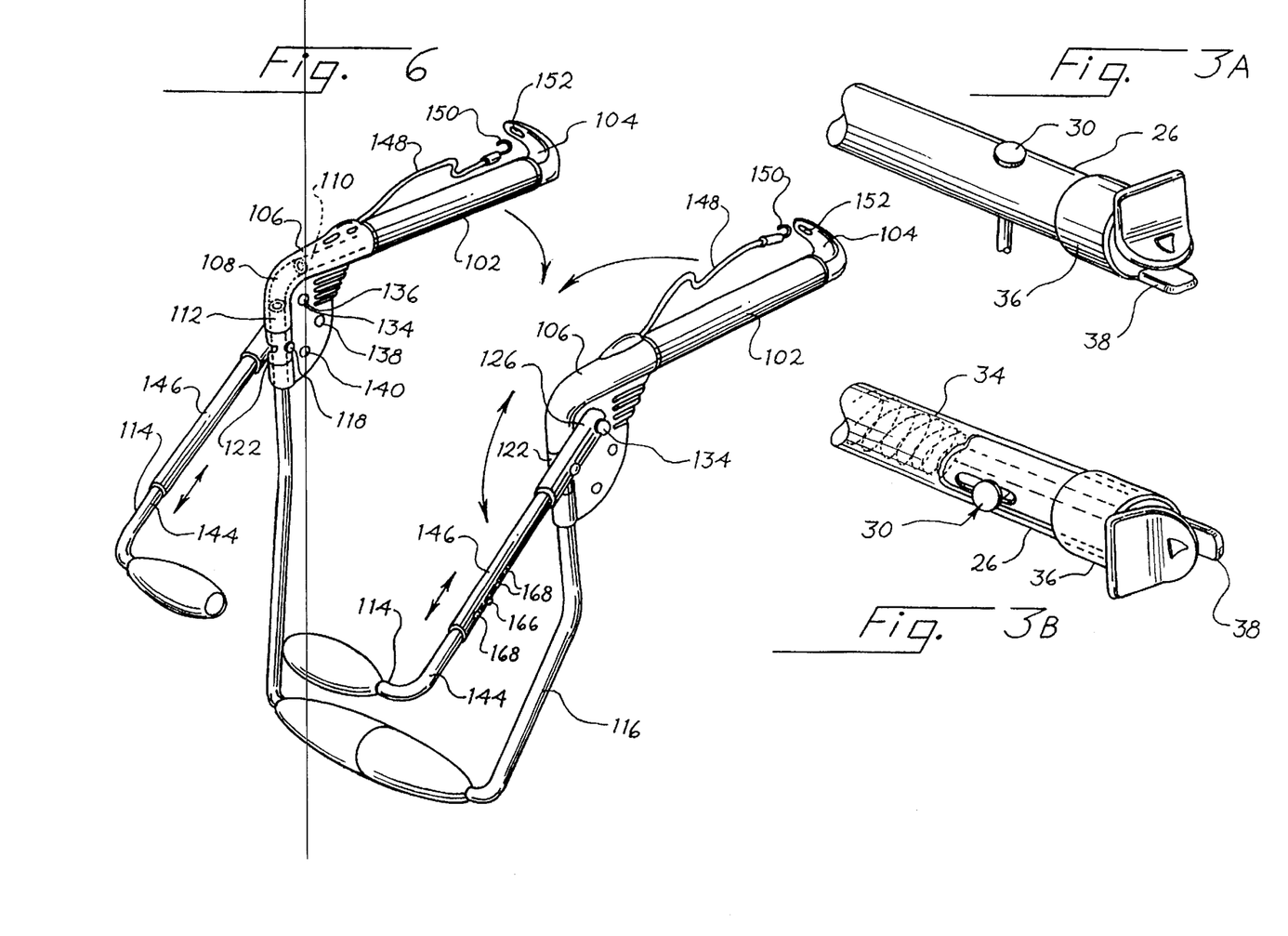
FIG. 3A is a perspective view of alternative design for the proximate end of the upper mounting member that may be used in accordance with the present invention.
FIG. 3B is a cut away view of the upper mounting member shown in FIG. 3A.
FIG. 6 is a perspective view of a carrier incorporating yet another embodiment of the present invention.

The joints (6) include a locking mechanism that controls the rotation of the joint about the vertical axis (B). As described below, in the embodiment illustrated in FIG. 1, this locking mechanism includes a plurality of arcuately positioned cavities (40) which function as stops. In addition, the proximate ends (26) of the upper mounting member (14) include a locking mechanism that locks the upper mounting member (14) in a given angular position relative to the lower mounting member (16). In a preferred embodiment of the present carrier, as illustrated in FIGS. 3A and 3B, this locking mechanism includes a spring (34) and a body (36) having a projection (38) extending therefrom. The spring (34) and the body (36) may be positioned within the proximate end (26) of the upper mounting member (14) as shown in FIGS. 3A and 3B, or the upper mounting member (14) may extend into the body (36) as shown in FIGS. 1 and 2. As more fully described below, the body (36) is biased outward by the spring (34) such that the projection (38) may be secured within one of a plurality of arcuately positioned cavities (40) in the joint (6).

The carrier can assume a storage configuration wherein the support members (2) and the mounting members (14), (16) are positioned substantially within the same plane. The carrier may also assume a number of use configurations. In the specific embodiment illustrated in FIG. 1, the carrier may assume five use configurations. This is accomplished as follows. First, the support member (2) and the joint (6) are rotated outwardly about the pivot axis B until a latch formed by the edge (19) of the second boss (21) of FIG. 4b holds the joint (6) and the support member (2) in the extended or use orientation about the axis B. This latch prevents unwanted inward rotation of the joint (6), and allows the user to position the upper mounting member (14) easily. Next, the upper mounting member (14) is pivoted to engage the projection (38) into the first one of the cavities (40). The joint (6) is provided with a ramp surface such that the spring (34) is automatically compressed and the projection (38) is automatically pushed inwardly as the upper mounting member (14) approaches the first cavity (40). Then the user pushes the body (36) of the locking member inwardly, overcoming the bias of the spring (34) to align the projection (38) with the desired one of the cavities (40). The body (36) of the locking mechanism is then released, and the spring (34) biases the projection (38) into the selected cavity (40). As a result, the upper mounting member's locking mechanism and the joint's locking mechanism function together to lock the upper mounting member (14) in position relative to the lower mounting member (16), and also to lock the support arms (2) in place preventing them from rotating inwardly about the pivot axis B in the direction indicated by the arrows (C) in FIG. 1.

The above-described process may be reversed to reconfigure the carrier to its storage position wherein the support members (2) and the mounting members (14), (16) are all positioned essentially within the same plane.

Once the support members (2) and the upper mounting member (14) are locked in place, the carrier may be positioned on a vehicle. The carrier may include cushioning pads (42) on the upper mounting member (14) and the lower mounting member (16) to prevent damage to the vehicle's paint that may result from attaching the carrier.

The carrier may also include tie-down cords (48), (49) to secure a load in place on the carrier. As shown in FIG. 1, one end of the tie-down cord (48) may be attached the saddle (11). The opposite end of the tie-down cord (48) includes a hook (50) designed for engagement with an opening (52) in the joint (6). When a load is positioned in the saddle (11) on the support members (2), the tie-down cord (48) may be wrapped around the load and secured by placing the hook (50) within the opening (52).

In addition to being used to transport a load on a vehicle, the carrier of the present invention may be used as a storage rack. Specifically, the upper mounting member (14) can be adjusted such that there is a 180° angle between it and the lower mounting member (16). The carrier can then be hung on a wall with bicycles being placed thereon for storage. In this configuration the latch formed by the second boss (23) of FIG. 4b holds the joint (6) and the support member (2) in the proper orientation about the axis B.

Preferably, the joint (6) holds the support member (2) at an angle somewhat greater than 90° with respect to the lower mounting member (16). With this arrangement, when the lower mounting member (16) is oriented in the preferred vertical orientation, the support member (2) is tilted somewhat upwardly such that the force of gravity tends to move the load toward the lower mounting members (16), thereby reducing any tendency for the load to move off of the support members (2). This arrangement also allows the support members (2) to pass over one another easily when they are rotated about the pivot axis B to the overlapping storage position. The joint (6) prevents the support arm members (2) from rotating downwardly with respect to the lower mounting member (16). In this way, one potential failure mode of the carrier is entirely eliminated.

When the support member (2) is in the operational, fully open position, the support member (2) is positioned in the same plane as the upper part of the respective lower mounting member (16), and the centerlines of these two parts intersect. This arrangement allows downward loads on the support member (2) to be transferred efficiently to the lower mounting member (16), without undesired torques resulting from offset between the centerlines of the support member (2) and the upper part of the respective lower mounting member (16).

Alternative embodiments of the present invention are illustrated in FIGS. 5 to 8. The embodiment shown in FIG. 5 is functionally identical to the embodiment described above and shown in FIGS. 1–4. FIG. 5, however, illustrates the use of a support arm (72) having an over-molded rubber element that forms the surface shape of the support arm (72). In addition, the support arm (72) includes three saddles (76, 78, 80) for cradling a load, such as a bicycle.

In the embodiment shown in FIG. 6, the carrier includes two upper mounting members (114) that are essentially L-shaped, and are mirror images of one another. The carrier also includes a lower mounting member (116) that is essentially U-shaped. Those skilled in the art will appreciate that, alternatively, the lower mounting member (116) may include two substantially L-shaped members similar to the upper mounting members (114).

In the embodiment shown in FIG. 6, the upper mounting members (114) include a telescoping feature, whereby each upper mounting member includes a first tube (144) that extends into a second tube (146). A locking pin (166) is inserted into openings (168) along the first and second tubes (144), (146) to secure the length of the upper mounting member (114). The lower mounting member may include a similar telescoping feature. Such a telescoping feature can be used to adjust the carrier to allow a more precise fit on vehicles of varying sizes and types.

The joints (106) shown in FIG. 6 include a single passageway (108) that has a substantially horizontal portion (110), and a substantially vertical portion (112). Each support member (102) extends into and is secured within the substantially horizontal portion (110) of the passageway (108). The support members (102) may be secured within the passageway (108) by any convention means. In addition, the upper ends (118) of the lower mounting member (116) are secured within the substantially vertical portions (112) of the passageways (108), and the vertical channels (124) of the sleeves (122) in the same manner as described above in reference to the embodiment shown in FIG. 1.

In the embodiment shown in FIG. 6, the locking mechanism includes a pin (134). The pin (134) is located near the proximate end (126) of the upper mounting member (114), and the pin (134) extends inwardly toward the opposing upper mounting member. Pin (134) is positioned such that it may be secured within one of a plurality of arcuately positioned openings in the joint (106). In particular, the carrier is adjusted to assume one of three use configurations as follows. First, the upper mounting members (114) are adjusted to the proper angle relative to the lower mounting member (116). This angle is determined by the type of vehicle to which the carrier will be attached. For example, if the carrier will be attached to sedan, a relatively small angle is required, and the upper mounting members are adjusted so that the pin (134) is aligned with the first opening (136). Larger angles are required for attachment to a hatchback or van. Accordingly, the upper mounting members would then be adjusted so that the pin (134) is aligned with either the second opening (138) or the third opening (140). Once the upper mounting member (114) is properly positioned, the support member (102) and joint (106) are rotated outward, and the pin (134) engages the appropriate opening.

Each joint may include an additional locking mechanism that locks the support members (102) in their use positions. This locking mechanism may include a spring loaded detent located at the end of the pin (134) or along the upper end (118) of the lower mounting member (116), or it may simply consist of friction.

The support members (102) shown in FIG. 6 include lips (104) to prevent the load from sliding off the carrier when in use. The embodiment shown in FIG. 6 also incudes tie-down cords (148) to facilitate securing a load thereto. As shown, one end of the tie-down cord (148) may be attached the joint (106). The opposite end of the tie-down cord (148) includes a hook (150) designed for engagement with an opening (152) in the lip (104). When a load is positioned on the support members (102), the tie-down cord (148) may be wrapped around the load and secured by placing the hook (150) within the opening (152).

Figure 7:
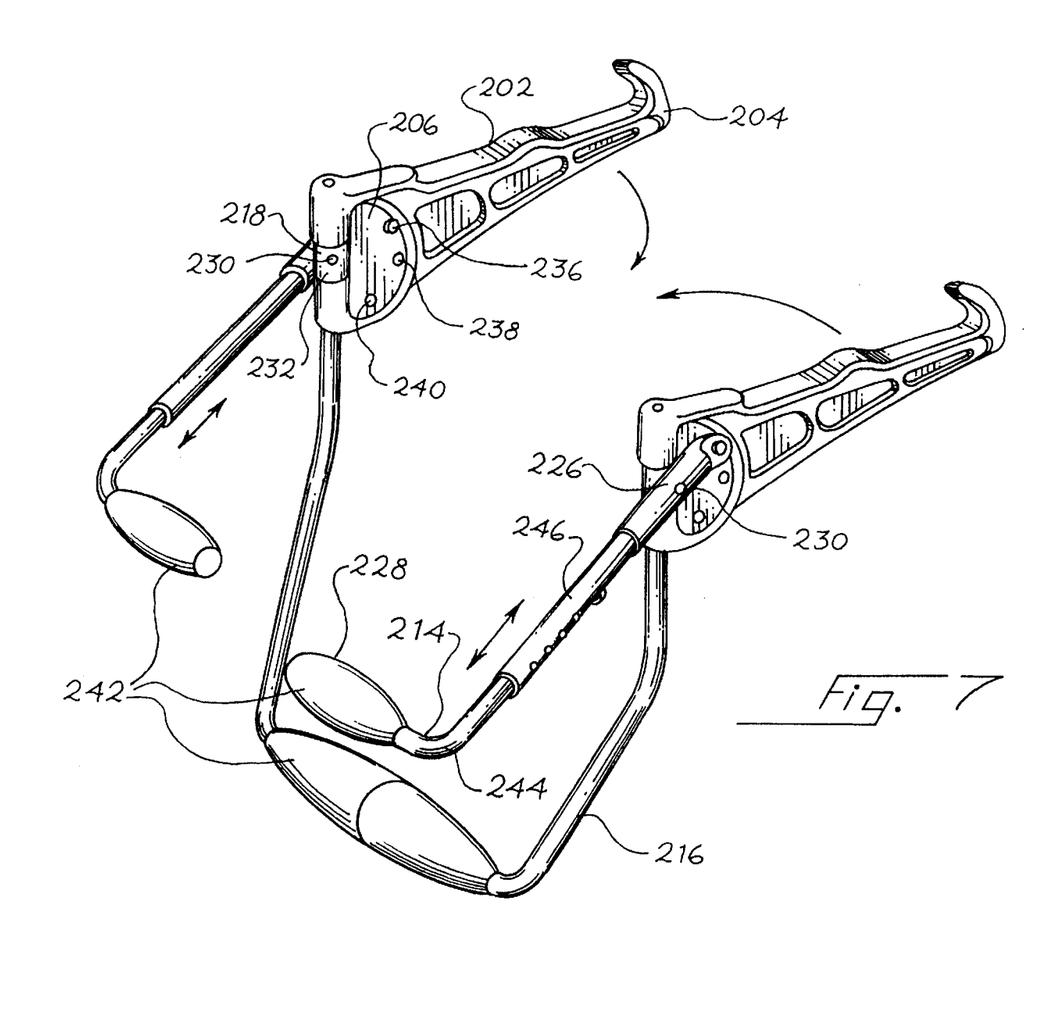
FIG. 7 is a perspective view of a carrier incorporating still another embodiment of the present invention.

In the embodiment shown in FIG. 7, the joint (206) is integral with the support member (202). Such a support member/joint may be formed by injection molding a plastic such as a glass-filled nylon. In addition, the entire passageway within the joint (206) is substantially vertical. In this embodiment, the support member (202) and joint (206) are formed from injection molded plastic, such as glass-filled nylon.

Figure 8:
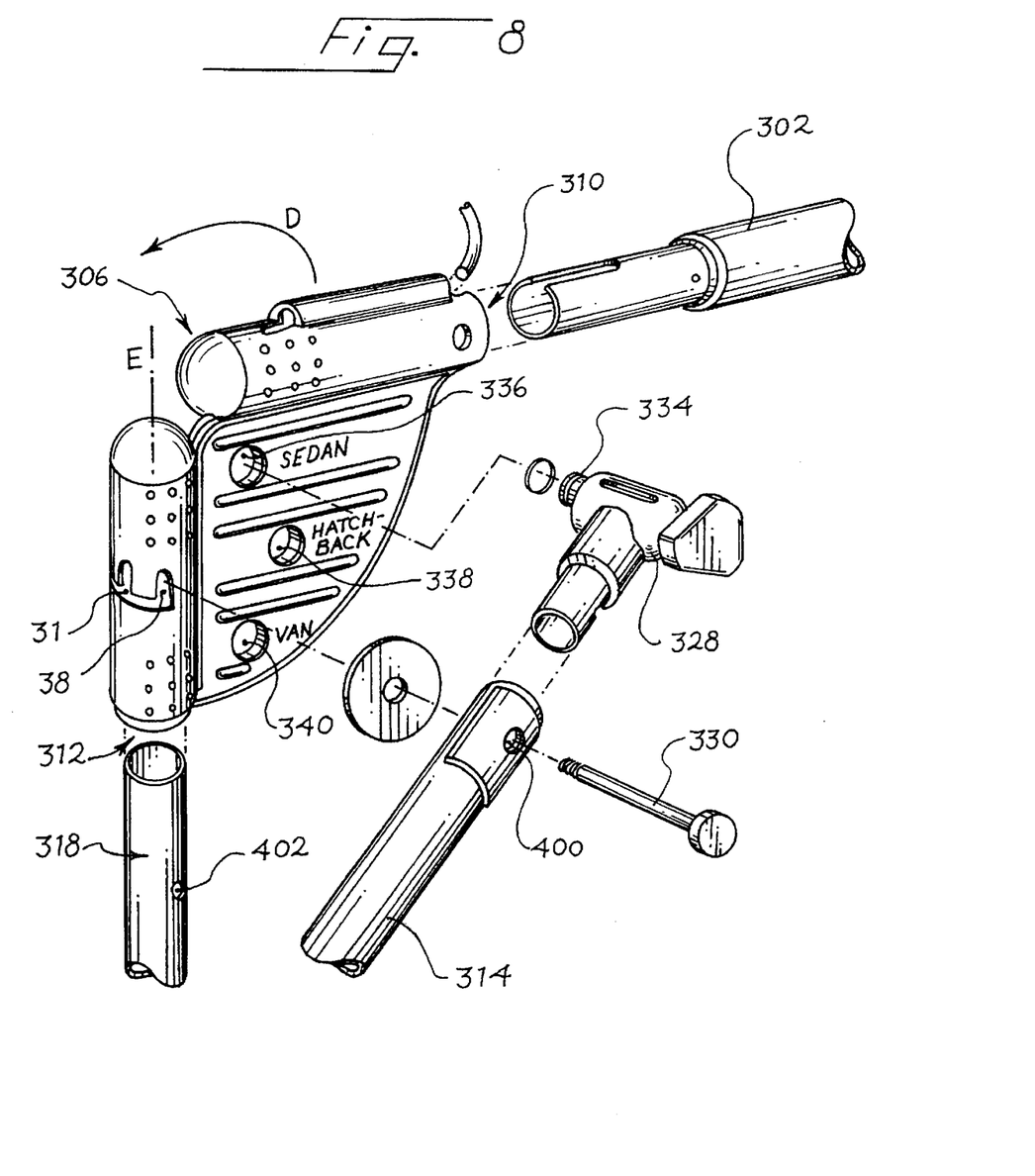
FIG. 8 is a fragmentary exploded view of a carrier incorporating still another embodiment of the present invention.

In another embodiment of the present invention illustrated in FIG. 8, the joint (306) includes a first passageway (312) that is substantially vertical, and a second passageway (310) that is substantially horizontal. An upper end (318) of the lower mounting member is secured within the first passageway (312), and the support members (302) are secured within the second passageway (310). The joint (306) includes a slot (354) extending around the first passageway (312). The slot (354) includes a plurality of upwardly extending recesses (358).

An axial pin (330) secures the upper mounting member (314) to the upper end (318) of the lower mounting member by extending through the opening (400) in the upper mounting member (314) and through the opening (402) in upper end (318), which is positioned within the first passageway (312). A nut is attached to the threaded end of the axial pin (330) to lock it in position. The ends of the axial pin (330) are secured within the recesses (358) when the support member (302) is in a use position or a storage position.

The carrier is adjusted from a use configuration to a storage configuration by lifting up on the support member (302) until the two ends of the axial pin (330) are released from the recess (358). The support member (302) may then be rotated in the direction indicated by the arrow (D). The support member (302) is rotated about the vertical axis (E) defined by the first passageway (312), while the axial pin (330) travels along the slot (354). Once the support member has been rotated 90°, the support member (302) is pushed down until the ends of the axial pin (330) are locked within the recesses (358). At that point, the support member (302) is essentially within the same plane as the lower mounting member.

The distal end (328) of the upper mounting member (314) carries a spring-loaded pin (334). This pin (334) can be pulled out of engagement from one of the three openings (336), (338), (340) within the joint (306) when the joint 306 is to be pivoted or the angular position of the upper mounting member (314) is to be adjusted. Once the pin (334) is pulled out of engagement, the upper mounting member (314) is free to rotate about the axial pin (330), and is rotated until the angle between it and the lower mounting member is essentially zero. At this point, the upper mounting members (314), the support members (302), and the lower mounting member are all in virtually the same plane, and the carrier may be readily stored. This procedure may be reversed to reconfigure the carrier to a use position.

Figure 9:
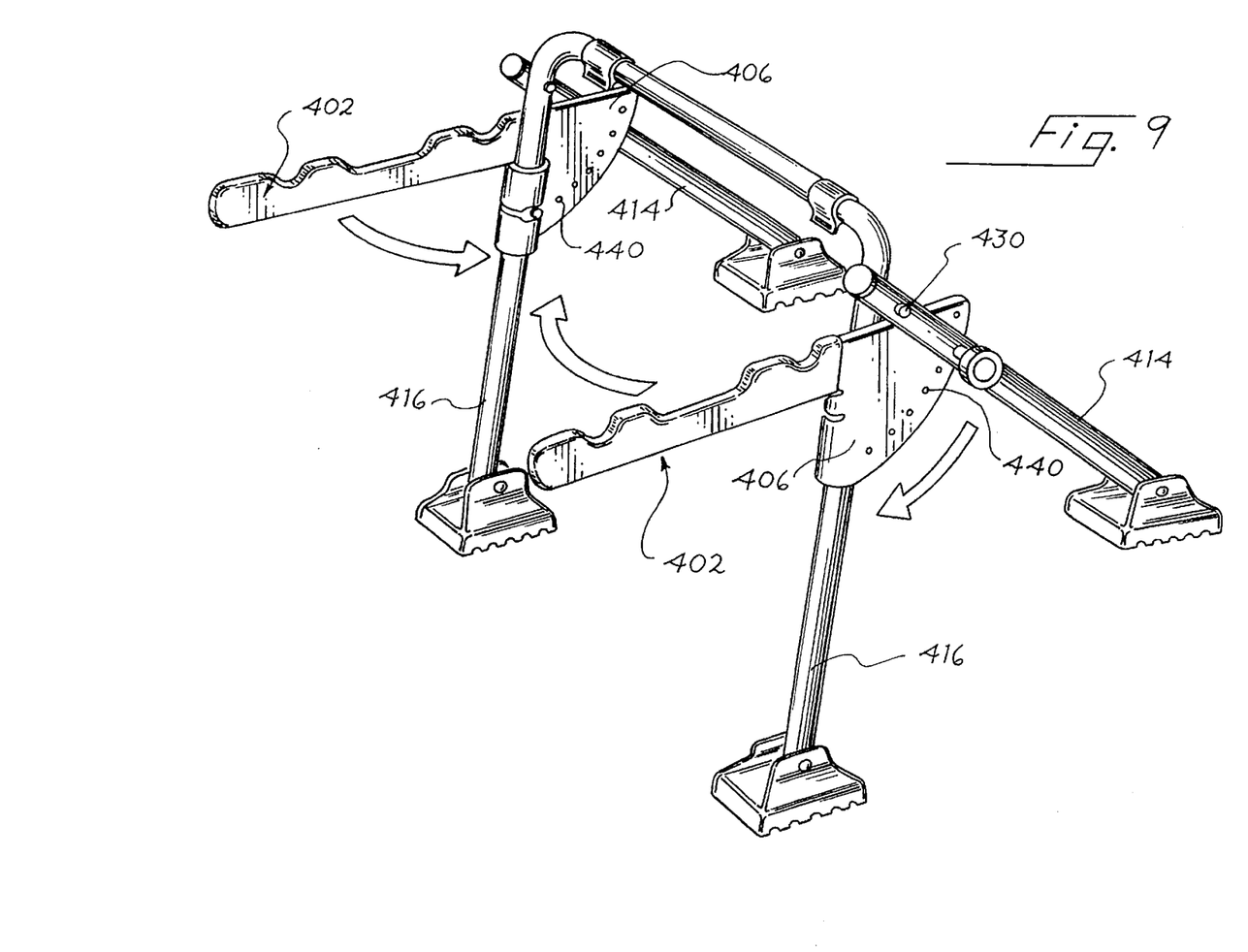
FIG. 9 is a perspective view of a carrier incorporating another embodiment of the present invention.

FIG. 9 shows yet another embodiment of the carrier of this invention. As before, in this embodiment the support members (402) are rigidly attached to the joints (406), and the joints (406) are mounted for pivotal motion about the lower mounting members (416). In this case each upper mounting member (414) pivots about a pin (430) that is secured directly to the lower mounting member (416). The arcuately positioned cavities (440) are positioned on the joint (406) on the opposite side of the lower mounting member (416) from the support members (402). The carrier of FIG. 9 can be adjusted as described above between a use position as shown in FIG. 9, and a storage position in which the upper and lower mounting members (414), (416) and the support members (402) are substantially coplanar.

Of course, a wide range of materials can be used in the embodiments described above. Certain portions such as the projection (38) are preferably formed of rigid, tough materials such as the nylon resin marketed by DuPont as Resin BK105. Elements such as the joint (6) can be formed of a glass-filled nylon such as that marketed by DuPont as Resin G7033.

Of course, a wide range of changes and modifications can be made to the preferred embodiments described above. Materials, proportions, and structures can all be modified as appropriate for the particular application. Additionally, a wide range of accessories can be used with the embodiments described above. For example, a ski rack, a wheel chair rack, a cargo rack, or the like can easily be mounted to the carrier supported by the support members, the lower mounting members, or both. Additionally, the indexing portion of the joint (6) can be formed separately, as for example in a stamped metal part which is then assembled with the remainder of the joint. If desired, the pivot axis for the upper mounting member may be offset with respect to the lower mounting member such that the pivot axis does not intersect the lower mounting member. Also, in some applications it may be preferable to replace the upper mounting member with a flexible restraining strap.

The terms "horizontal" and "vertical" as used in this specification are intended only to provide an easily understood description, and this invention can be used in any desired orientation.

It is the following claims rather than the preferred embodiments that are intended to define the scope of this invention.

What is claimed is:

1. A carrier for attachment to a vehicle comprising:

upper and lower mounting members;

a first pivot joint associated with the upper and lower mounting members such that the upper mounting member may be pivoted with respect to the lower mounting member about a mounting member pivot axis;

a support member; and a second pivot joint associated with the support member and the lower mounting member such that the support member may be pivoted with respect to the lower mounting member about a support member pivot axis, wherein the support member pivot axis is substantially perpendicular to the mounting member pivot axis;

whereby the lower mounting member, the upper mounting member and the support member can be positioned in a substantially coplanar storage position;

an array of stops arranged around the mounting member pivot axis, wherein the upper mounting member engages a selected one of the stops to fix the upper mounting member in position with respect to the lower mounting member with respect to pivotal movement about the mounting member pivot axis, and wherein the stops are configured such that pivotal movement of the support member about the support member pivot axis moves the stops toward and away from the upper mounting member.

2. The carrier of claim 1 wherein the stops and the support member are positioned on one side of the lower mounting member.

3. The carrier of claim 1 wherein the stops and the support member are positioned on opposite sides of the lower mounting member.

4. A collapsible bicycle carrier for attachment to the rear of a vehicle comprising:

a joint having a plurality of stops and a passageway with a substantially vertical portion;

a lower mounting member having an upper portion extending into the vertical portion of the passageway such that the joint pivots about a first axis that is parallel to the upper portion of the lower mounting member;

an upper mounting member pivotally attached to the lower mounting member, and having a projection; and a support member associated with the joint to rotate with the joint about the first axis such that when the support member is pivoted about the first axis to an operational position the projection engages one of the stops.

5. The carrier of claim 4 wherein said joint includes a cavity extending along the vertical portion of the passageway, wherein the upper portion of the lower mounting member includes an axial pin receiving hole, and wherein the upper portion extends into the vertical portion of the passageway such that the axial pin receiving hole is aligned with the cavity.

6. The carrier of claim 5 further comprising an axial pin extending from the upper mounting member, through the cavity and into the axial pin receiving hole, thereby defining a second axis and pivotally connecting the upper mounting member and the lower mounting member such that the upper mounting member rotates about the second axis.

7. The carrier of claim 4 wherein the joint and the support member are integrally formed in one piece.

8. The carrier of claim 4 wherein the joint includes a substantially horizontal passageway, and wherein the support member is received in the horizontal passageway.

9. The carrier of claim 4 wherein the stops and the support member are positioned on one side of the lower mounting member.

10. The carrier of claim 4 wherein the stops and the support member are positioned on opposite sides of the lower mounting member.

11. The carrier of claim 4 wherein the support member defines an obtuse angle with the upper portion of the lower mounting member such that, when the lower mounting member is positioned vertically, the support member tilts downwardly toward the lower mounting member.

12. The carrier of claim 4 wherein the support member is positioned substantially coplanar with the upper portion of the lower mounting member.

\* \* \* \* \*